(12) United States Patent
Kojovic et al.

(10) Patent No.: US 7,738,221 B2
(45) Date of Patent: Jun. 15, 2010

(54) TRANSFORMER INRUSH CURRENT DETECTOR

(75) Inventors: Ljubomir A. Kojovic, Racine, WI (US); Martin T. Bishop, Oak Creek, WI (US); Timothy R. Day, Racine, WI (US)

(73) Assignee: Cooper Technologies Company, Houston, TX (US)

( * ) Notice: Subject to any disclaimer, the term of this patent is extended or adjusted under 35 U.S.C. 154(b) by 93 days.

(21) Appl. No.: 11/999,813

(22) Filed: Dec. 7, 2007

(65) Prior Publication Data

US 2009/0147412 A1 Jun. 11, 2009

(51) Int. Cl.
*H02H 7/04* (2006.01)

(52) U.S. Cl. .......................................... 361/36
(58) Field of Classification Search ................... 361/35, 361/63, 115, 36
See application file for complete search history.

(56) References Cited

U.S. PATENT DOCUMENTS

| | | | |
|---|---|---|---|
| 4,063,166 A | 12/1977 | Glavitsch | |
| 4,446,420 A | 5/1984 | Dronet | |
| 4,449,417 A | 5/1984 | Wright et al. | |
| 4,570,231 A | 2/1986 | Bunch | |
| 4,623,949 A | 11/1986 | Salowe et al. | |
| 4,709,205 A | 11/1987 | Baurand et al. | |
| 4,709,339 A | 11/1987 | Fernandes | |
| 4,749,940 A | 6/1988 | Bullock | |
| 4,766,549 A | 8/1988 | Schweitzer et al. | |
| 4,933,630 A | 6/1990 | Dupraz | |
| 4,939,449 A | 7/1990 | Cattaneo et al. | |
| 5,115,447 A | 5/1992 | Bowman | |
| 5,414,400 A | 5/1995 | Gris et al. | |
| 5,434,509 A | 7/1995 | Blades | |
| 5,442,280 A | 8/1995 | Baudart | |
| 5,461,309 A | 10/1995 | Baudart | |
| 5,608,327 A | 3/1997 | Jones et al. | |
| 5,825,189 A | 10/1998 | Johns | |

(Continued)

FOREIGN PATENT DOCUMENTS

EP  0 494 720  6/1974

(Continued)

OTHER PUBLICATIONS

U.S. Appl. No. 11/999,813, Kojovic et al.

(Continued)

*Primary Examiner*—Stephen W Jackson
*Assistant Examiner*—Angela Brooks
(74) *Attorney, Agent, or Firm*—King & Spalding LLP

(57) ABSTRACT

A differential protection system for power transformers using Rogowski coils as current sensors can support an inrush current detection method based on sensing lows in the derivative of the sensed current. Effective detection of power transformer inrush conditions can enable blocking of a protection relay during inrush where the differential current may exceed a differential threshold value indicative of a fault without the presence of an actual fault. The outputs of the Rogowski coils, being proportional to the first time derivative of the sensed current, may be useful in the inrush detection method. Also, with reduced saturation concerns, the Rogowski coil protection system may employ a single slope response with increased sensitivity. A discrete time sampling technique for identifying low di/dt portions within the sensed current also may be useful in detecting power transformer inrush conditions.

30 Claims, 5 Drawing Sheets

U.S. PATENT DOCUMENTS

| | | | |
|---|---|---|---|
| 5,852,395 | A | 12/1998 | Bosco et al. |
| 5,903,155 | A | 5/1999 | Bjorklund |
| 6,313,623 | B1 | 11/2001 | Kojovic et al. |
| 6,544,314 | B2 | 4/2003 | Stendera et al. |
| 6,563,296 | B2 | 5/2003 | Cooke |
| 6,597,180 | B1 | 7/2003 | Takaoka et al. |
| 6,680,608 | B2 | 1/2004 | Kojovic et al. |
| 6,781,361 | B2 | 8/2004 | Nestler |
| 6,782,329 | B2 | 8/2004 | Scott |
| 6,810,069 | B2 | 10/2004 | Kojovic et al. |
| 6,822,457 | B2 | 11/2004 | Borchert et al. |
| 6,940,702 | B2 | 9/2005 | Kojovic et al. |
| 6,954,704 | B2 | 10/2005 | Minami et al. |
| 6,958,894 | B2 * | 10/2005 | Kang et al. .................... 361/38 |
| 7,180,717 | B2 | 2/2007 | Kojovic et al. |
| 7,227,347 | B2 | 6/2007 | Viaro et al. |
| 2001/0029433 | A1 | 11/2001 | Scott |
| 2002/0125877 | A1 | 9/2002 | Cooke |
| 2003/0112569 | A1 | 6/2003 | Kato et al. |
| 2004/0004794 | A1 * | 1/2004 | Kang et al. .................... 361/38 |
| 2004/0012901 | A1 * | 1/2004 | Kojovic et al. ................ 361/19 |
| 2004/0027748 | A1 * | 2/2004 | Kojovic et al. ................ 361/62 |
| 2004/0027750 | A1 | 2/2004 | Minami et al. |
| 2004/0183522 | A1 | 9/2004 | Gunn et al. |
| 2005/0248430 | A1 | 11/2005 | Dupraz |
| 2006/0012374 | A1 | 1/2006 | Kojovic et al. |
| 2007/0236208 | A1 | 10/2007 | Kojovic et al. |

FOREIGN PATENT DOCUMENTS

| | | |
|---|---|---|
| GB | 1 355 827 | 7/1992 |

OTHER PUBLICATIONS

U.S. Appl. No. 11/593,240, Kojovic et al.
U.S. Appl. No. 11/593,239, Kojovic et al.
L Kojovic, "Rogowski Coils Suit Relay Protection and Measurement"; Jul. 1997, pp. 47-52.
E. Thuries, et al.; "Contribution of Digital Signal Processing in the Field of Current Transformers"; 1996, pp. 1-11.
T & M Research Products Inc., "Current Viewing Probe"; pp. 35 and 36.
P. Mahonen et al., "The Rogowski Coil and the Voltage Divider in Power System Protection and Monitoring"; 1996, pp. 1-7.
G. Schett et al., "The Intelligent GIS—A Fundamental Change in the Combination of Primary and Secondary Equipment", CIGRE, 1996, Switzerland, pp. 1-10.
V. Heumann, "Magnetischer Spannungsmesser Hoher Praazision," Elektrotechnische Zeitschrift Ausgabe A, May 21, 1962, Germany, pp. 349-356.

* cited by examiner

TRANSFORMER INRUSH CURRENT DETECTOR

FIELD OF THE INVENTION

The present invention relates to a differential protection system for power transformers and more specifically to a power transformer protection system using Rogowski coils for current sensing and for detecting inrush current of the power transformer.

BACKGROUND

A power transformer is used to step up, or step down, a voltage. That is, the output voltage is the input voltage times a step factor. The step factor is generally called the transformer ratio and is also known as turns ratio. This ratio is defined as the ratio of the primary and secondary voltages for a two winding transformer. Generally, a transformer that steps up voltage will step down current while a transformer that steps down voltage will step up current. Since power equals voltage times current, power is the same on both sides of the transformer, ignoring transformer losses. Aside from being multiplied by the transformer ratio, the current entering a power transformer should be equal to the current leaving the power transformer. A difference between the current entering the transformer and the current leaving the transformer can indicate a fault within the transformer where current is being diverted into the transformer rather than passing through the transformer.

Differential protection of power transformers is a technique that compares the current entering the transformer with the current leaving the transformer. One side of a transformer is the primary while the other side is the secondary. Usually, the side where power enters is the primary. A differential protection system senses the current at the primary side and also senses the current at the secondary side. The area between the current sensors is called the protection zone. The differential protection system determines if there is an excessive difference, aside from the scaling factor, between the two current sensors. If the difference exceeds the relay setting (differential threshold), a fault within the protection zone is likely, and a protection relay initiates operation of a circuit breaker or other device to isolate the power transformer.

The difference between the primary current and the secondary current that is required to trip the differential protection system and to cause the protection relay to operate can be called the differential threshold of the differential protection system. A differential protection system with a lower differential threshold may be more sensitive, but can be falsely triggered by non fault events.

Generally, current transformers are used in a differential protection system to sense the primary current and the secondary current. Current transformers typically have iron cores and may saturate. Transformer core saturation occurs when more magnetic flux is induced within the transformer than can be handled by the core. When a transformer core saturates, it may lose its inductive characteristics allowing currents in the transformer windings to temporarily spike to extremely high levels. Unequal saturation between the current transformer sensing the primary current and the current transformer sensing the secondary current is an example of a false triggering event as no fault is involved.

To avoid erroneously detecting fault conditions for reasons such as current sensor saturation, the differential threshold of a protection system may be set as a percentage of the current passing through the transformer. This differential threshold setting generally is provided by adding restraint components to stabilize the protection relay. Relay stabilization improves performance since high through currents will require a higher differential current to operate the relay. This quality generally is characterized by the slope of the relay. The slope is given by a sloped line that relates the current passing through the transformer with the differential threshold setting. The line is sloped because a higher through-current implies setting a higher differential threshold. Such a relationship may be illustrated using an upward sloping line when plotted on a graph with through-current on the horizontal axis and differential current threshold on the vertical axis. In systems where the relay is controlled digitally, multiple slopes may be utilized to avoid inappropriately operating the protection relay in conditions involving severe current transformer saturation caused by high fault currents.

Inrush current is the input current drawn by a device when power is initially applied to the device. Inrush current is a startup transient. When a power transformer is first energized, an inrush current much larger than the rated transformer current can flow for up to tens of seconds. That is, when a transformer is first powered on, a higher current must flow into the transformer to establish the magnetic fields within the transformer core. Inrush current flows at the energizing side of the transformer, while there may be little or no current flow at the other side of transformer. In a networked application, the energizing side of the transformer may be the primary side or the secondary side. Since inrush current generally flows on only one side of the transformer, the current differential between the primary and secondary sides of the transformer easily can exceed the differential threshold of the differential protection system and can cause the protection relay to isolate the power transformer even though an actual fault does not exist.

The unnecessary isolation of a power transformer during an inrush condition can be mitigated by detecting the inrush current and, in response, blocking the differential protection element within the protection relay. Traditionally, inrush current is detected by extracting the second harmonic component from the inrush current using mathematical algorithms. This technique typically involves applying filters to the current measurements to isolate the second harmonic component which is a portion of the current signal at about twice the operating frequency of the power system. Various filter designs, of differing complexities, have been developed to extract this second harmonic information. Varying response characteristics at this second harmonic for different transformers, as well as the complexity of the related filter designs, often complicate such traditional approaches.

Accordingly, there is a need in the art for a power transformer differential protection system for more accurately detecting inrush current and to reduce the unnecessary isolation of the power transformer during an inrush condition.

SUMMARY OF THE INVENTION

The present invention relates to a differential protection system for power transformers using Rogowski coils as current sensors. A Rogowski coil can comprise a helical, or quasi-helical, coil of wire with the lead from one end returning through the center of the coil to the other end, so that both leads are at one end of the coil. The coil then may be formed around a straight conductor where the current in the straight conductor is to be measured. The voltage that is induced in the Rogowski coil is proportional to the rate of change of current in the straight conductor. This rate of change of current also is called the first time derivative of the current, or di/dt, or change in current per change in time. Thus, the output of the Rogowski coil can be used to represent di/dt where "i" is the current in the straight conductor being measured. Also, the output of a Rogowski coil can be connected to an electronic integrator circuit to provide a signal that is proportional to the sensed current.

Rogowski coils can provide low inductance and excellent response to fast-changing currents since they have air cores rather than an iron core. Without an iron core to saturate, a Rogowski coil can be highly linear even in high current applications. Furthermore, having reduced saturation concerns, the Rogowski coil protection system may employ a single slope response with increased sensitivity. Also, the geometry of a Rogowski coil may provide a current sensor that is significantly immune to electromagnetic interference.

The present invention further relates to methods for detecting inrush current for a power transformer. Using the output of the Rogowski coils, which is proportional to the derivative of the sensed current, periodic low di/dt periods in the sensed current are used to detect power transformer inrush conditions. Another aspect of the present invention relates to discrete time sampling techniques for identifying the low di/dt portions within the sensed current. Effective detection of power transformer inrush conditions can enable blocking of the protection system during inrush where the differential current may exceed the differential threshold without the presence of an actual fault.

The discussion of transformer protection systems in this summary is for illustration only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are included within this description, are within the scope of the present invention, and are protected by the accompanying claims.

Figure 1:
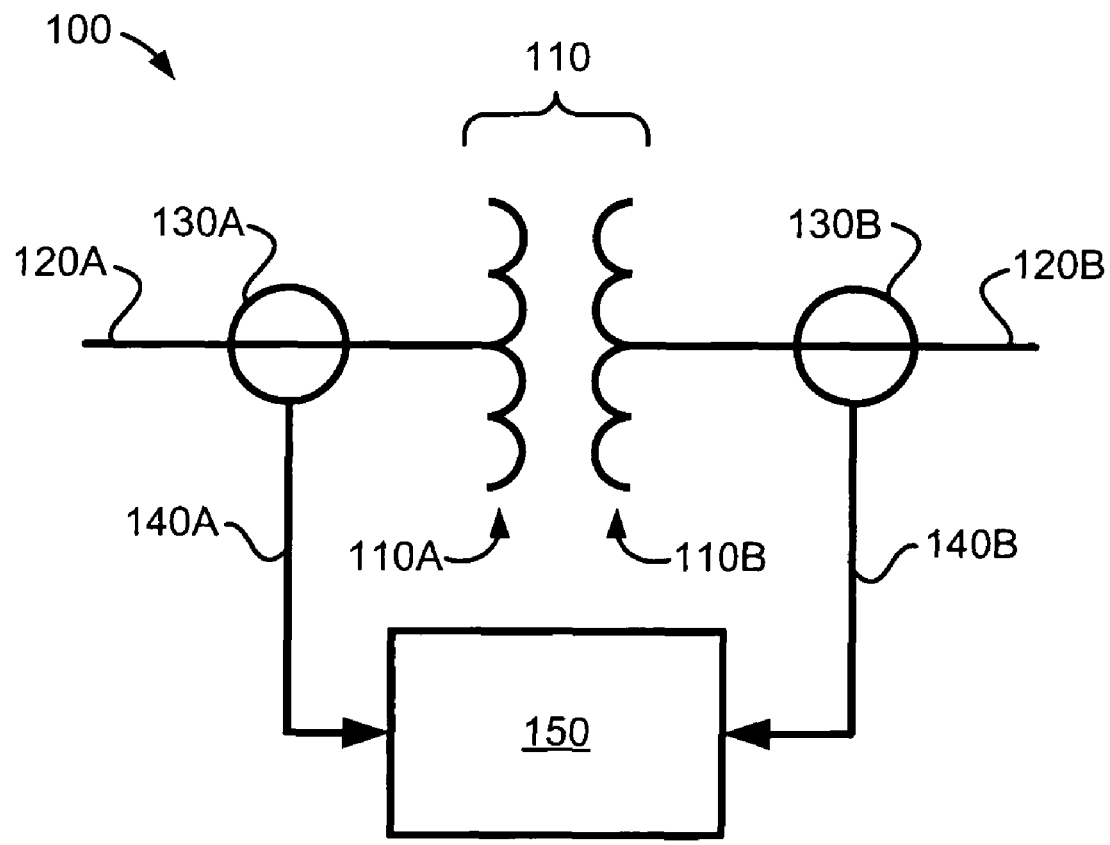
FIG. 1 is a circuit diagram illustrating a schematic representation of a transformer and a differential protection system using Rogowski coil current sensors according to one exemplary embodiment of the present invention.

Many aspects of the invention will be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention relates to a differential protection system for power transformers using Rogowski coils as current sensors and to methods for detecting inrush current for a power transformer. Using the output of the Rogowski coils, which is proportional to the derivative of the sensed current, periodic low di/dt periods in the sensed current are used to detect power transformer inrush conditions. Discrete time sampling techniques can be used for identifying the low di/dt portions within the sensed current. Effective detection of power transformer inrush conditions can enable blocking of the protection system during inrush where the differential current may exceed the differential threshold without the presence of an actual fault.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, the figure is a circuit diagram illustrating a transformer 110 and a differential protection system 100 using Rogowski coil current sensors 130A, 130B according to one exemplary embodiment of the present invention. The power transformer 110 may comprise a primary transformer coil 110A and a secondary transformer coil 110B. Alternating current (AC) may be conducted into, or out of, the primary transformer coil 110A through primary conductor 120A. Alternating current may be conducted into, or out of, the secondary transformer coil 110B through secondary conductor 120B. The current flowing in the primary conductor 120A may be sensed by a primary side Rogowski coil 130A. The current flowing in the secondary conductor 120B may be sensed by a secondary side Rogowski coil 130B. The portion of the system 100 between the primary side Rogowski coil 130A and the secondary side Rogowski coil 130B includes the transformer 110. This portion of the system between the sensor coils 130A, 130B can be referred to as the protection zone of the differential protection system 100.

The output of the primary side Rogowski coil 130A is the primary side sense signal 140A. The primary side sense signal 140A may be proportional to the first time derivative of the primary side current flowing in the primary conductor 120A. The output of the secondary side Rogowski coil 130B is the secondary side sense signal 140B. The secondary side sense signal 140B may be proportional to the first time derivative of the secondary side current flowing in the secondary conductor 120B.

A differential protection controller 150 can process the primary side sense signal 140A and the secondary side sense signal 140B to detect transformer inrush currents and to control the operation of a protection relay. In exemplary applications, the protection controller 150 may be referred to as the relay. The protection relay (not illustrated in FIG. 1) can isolate the transformer 110 when a fault condition occurs based upon an output of the protection controller 150. This isolation can be provided by a circuit breaker or other device operated by the protection relay. During inrush, a large difference between the current flowing in the primary conductor 120A and the current flowing in the secondary conductor 120B may occur even though a fault is not present within the zone of protection. By detecting an inrush condition, the differential protection controller 150 can block the unnecessary operation of the protection relay and associated circuit breakers during inrush.

Figure 5:
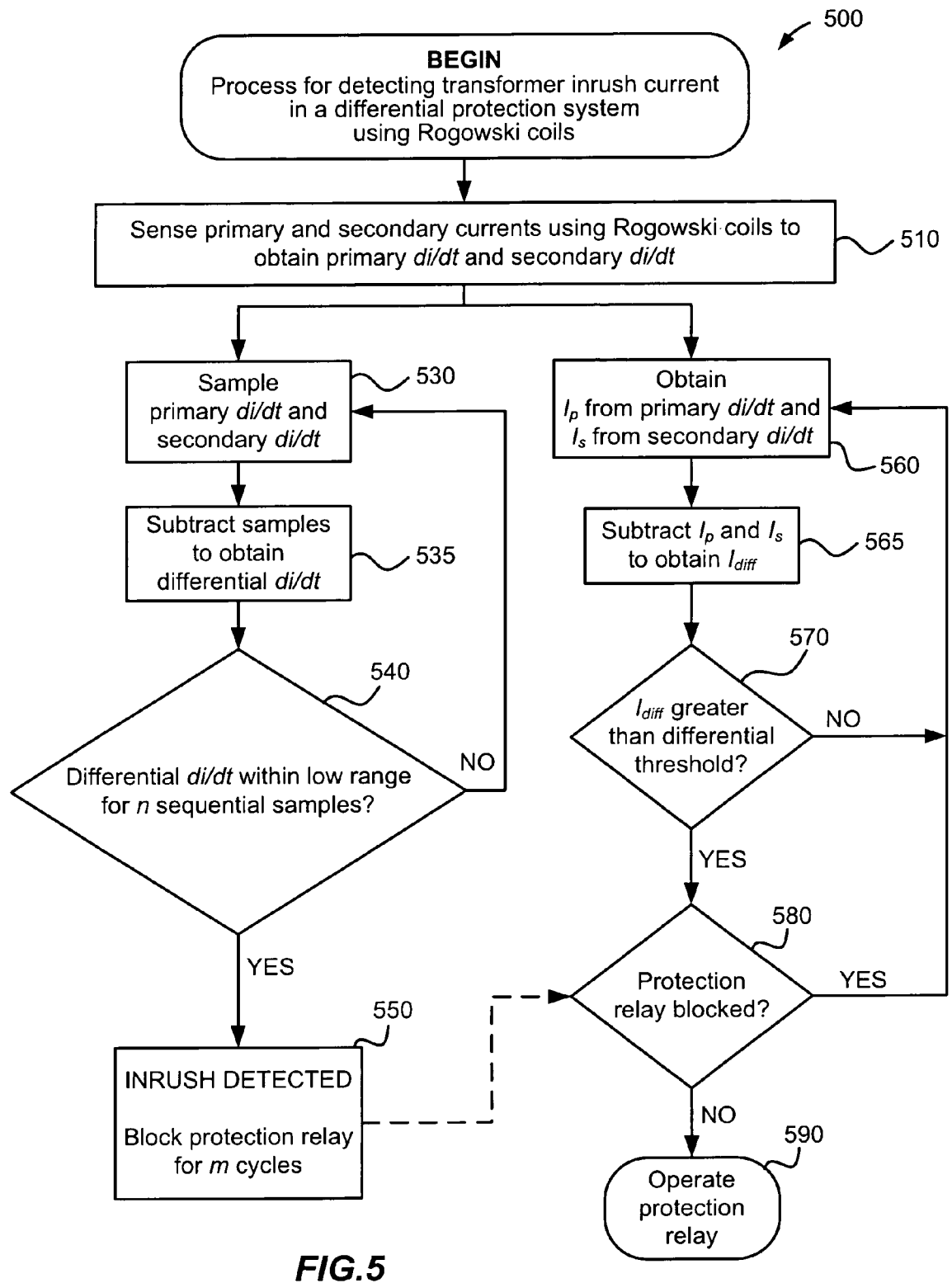
FIG. 5 is a logical flow diagram of a process for detecting transformer inrush current in a differential protection system using Rogowski coils according to one exemplary embodiment of the present invention.

The differential protection controller 150 may be operable to carry out a process for detecting power transformer inrush current similar to process 500 detailed with respect to FIG. 5. The differential protection controller 150 may comprise a microprocessor, a microcontroller, a digital signal processor, an analog signal processing circuit, an application specific integrated circuit (ASIC), a field programmable gate array (FPGA), a system on chip (SOC), a complex programmable gate array (CPLD), digital logic, combinational logic, sequential logic, any other computing mechanism, logic mechanism, state machine, or any combination thereof. The differential protection controller 150 may comprise software, firmware, hardware, or any combination thereof.

Although only a single phase of the transformer 110 is illustrated in FIG. 1, the protection system 100 may be operated with polyphase power systems. For example, two-phase, three-phase, or other such power transformers may be protected. In a three-phase system, three circuit conductors carry three alternating currents of the same frequency where, using one conductor as a reference, the other two currents are delayed in time by one-third and two-thirds of a cycle, respectively. A three-phase power transformer may have three primary windings and three secondary windings. The sensors 130 of the differential protection system 100 may be employed on any one of the three phases, any two of the phases, or all three of the phases. Even if the sensing is on only one or two of the phases, the protection relay, or relays, may isolate all three phases of the transformer using circuit breaker or other device operation. An indication of an inrush condition on one phase may be used to block any of the phase protection elements in the protection relay. Such operation can be referred to as cross-phase blocking or phase dependent blocking. Alternatively, the protection relay, or relays, may isolate each of the three phases of the transformer individually.

Figure 2:
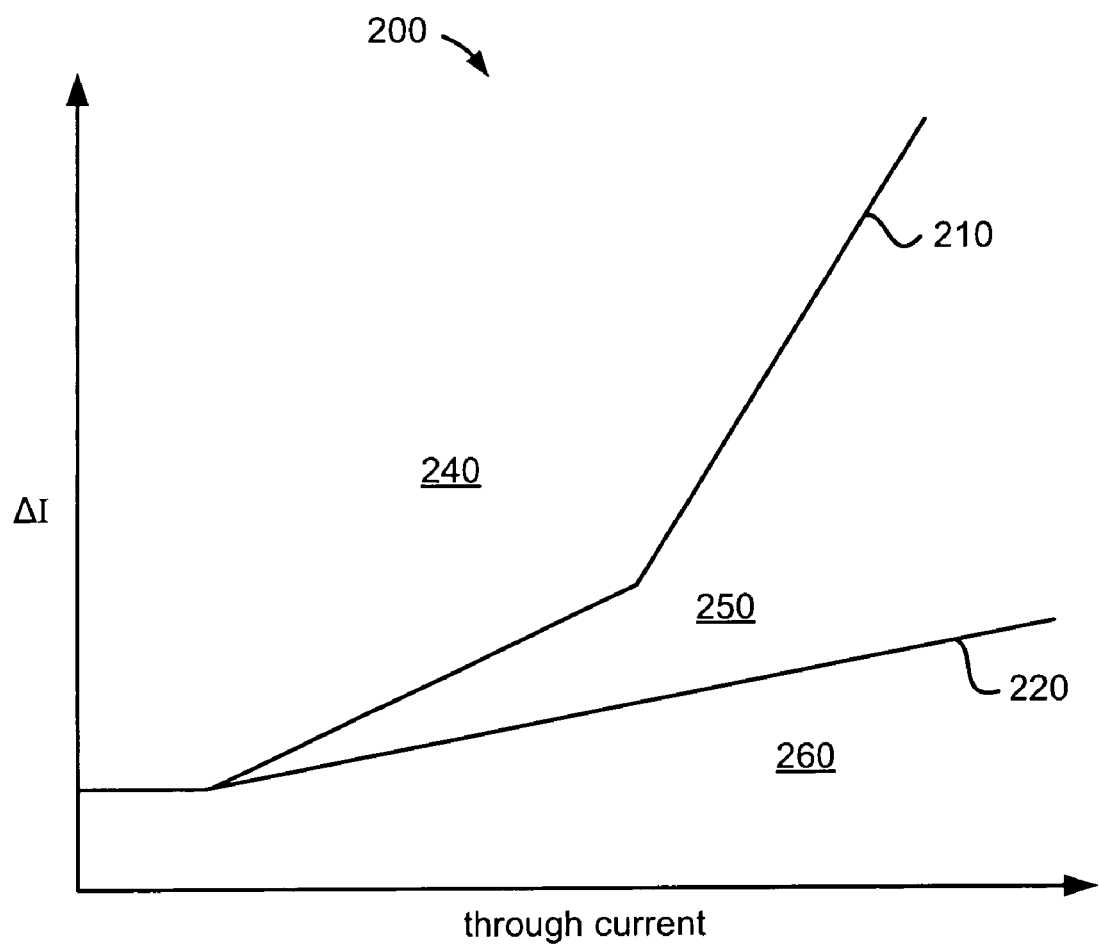
FIG. 2 is a graph illustrating relay slopes used in differential protection systems for transformers according to a conventional method and according to one exemplary embodiment of the present invention.

Turning now to FIG. 2, the figure is a graph 200 illustrating relay slopes used in differential protection systems for transformers according to a conventional method and according to one exemplary embodiment of the present invention. The horizontal axis of the graph 200 represents the current flowing through the transformer from the primary conductor 120A to the secondary conductor 120B. The vertical axis of the graph represents the differential current ($\Delta I$). Referring to the exemplary system 100 illustrated in FIG. 1, the differential current is the difference between the current flowing in the primary conductor 120A and the current flowing in the secondary conductor 120B. With respect to this differential current, and throughout the entire disclosure, it should be understood that comparing, or subtracting, primary and secondary currents can involve first adjusting one or both of the primary or secondary currents for the transformer ratio and/or the sensor ratio.

To avoid erroneously detecting fault conditions for reasons such as current sensor saturation, the differential threshold of a protection system may be set as a percentage of the current passing through the transformer. This differential threshold setting can be made by adding restraint components to stabilize the protection relay. Relay stabilization improves performance since high through currents will require a higher differential current to operate the relay. This quality generally is characterized by the slope of the relay.

The slope of a relay may be illustrated as a sloped line that relates the current passing through the transformer with the differential threshold setting. The line is sloped because a higher through-current implies setting a higher differential threshold. Such a relationship may be illustrated using an upward sloping line when plotted on a graph with through-current on the horizontal axis and differential current threshold on the vertical axis. In systems where the relay is controlled digitally, multiple slopes may be utilized to avoid inappropriately operating the protection relay in conditions involving severe current transformer saturation caused by high fault currents.

Curve 210 of the graph 200 illustrates an example double slope relay response that may be seen in traditional systems using iron-core current transformers to sense current. Multiple slopes may be utilized to avoid inappropriately operating the protection relay in conditions involving severe current transformer saturation. Such current transformer saturation may be caused by high fault currents. The increased slope of curve 210 at higher through currents represents an increase in the differential threshold current. Such an increase in the differential threshold current means that, at higher through-currents, a greater difference between the primary and secondary is required to trip the protection relay. In other words, for higher through-currents, the sensitivity of the protection system 100 may need to be reduced to avoid false positive operation that may be induced by increased core saturation in the sensing transformers at the higher currents.

In a protection system using Rogowski coils 130A, 130B to sense current according to an exemplary embodiment of the invention, saturation of the sensing mechanism may be substantially eliminated. Thus, the sensing coils 130A, 130B may deliver a more accurate representation of the current flowing in the primary conductor 120A and the current flowing in the secondary conductor 120B even at high through current operation of the transformer 110. With reduced need to accommodate errors in the sensing of the currents, the system 100 using Rogowski coils 130A, 130B can use a more sensitive relay slope such as that illustrated by curve 220 of the graph 200.

Region 260 of the graph 200 represents the blocking zone where operation of the protection relay is blocked. Region 240 of the graph 200 represents the operating zone where the operation of the protection relay is not blocked. When the operation of the protection relay is not blocked, the protection relay may operate to isolate the power transformer as the differential current exceeds the differential threshold representing a fault condition. Region 250 of the graph 200 represents a zone where the traditional current transformer based systems would block operation of the relay, but where Rogowski coil based systems 100 according to an exemplary embodiment of the invention may allow the protection relay to operate. This added operation zone 250 for such Rogowski coil based systems may provide a more sensitive protective differential protection solution.

Figure 3:
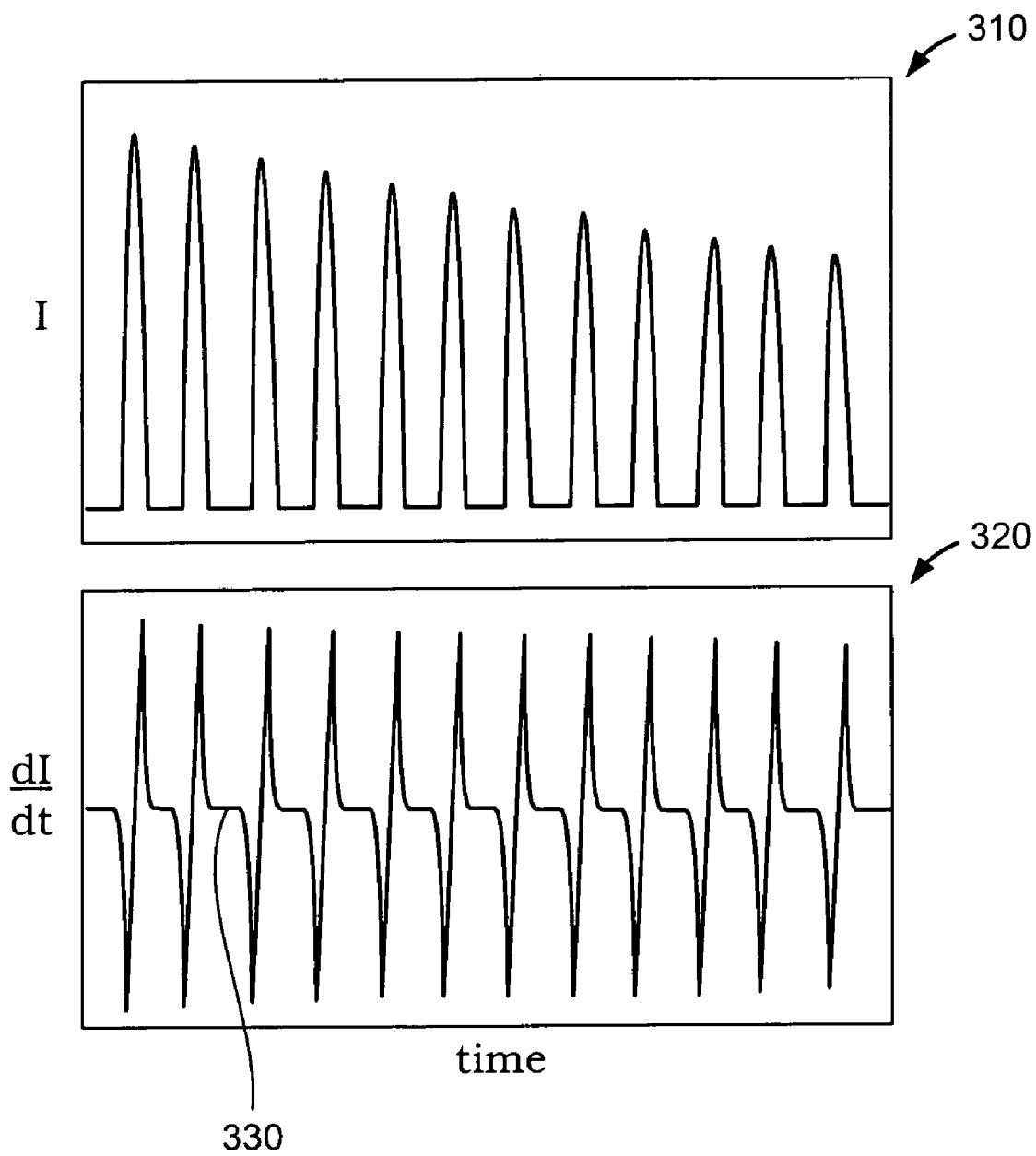
FIG. 3 is a plot illustrating the inrush current of a power transformer and a corresponding plot illustrating the output of a Rogowski coil according to one exemplary embodiment of the present invention.

Turning now to FIG. 3, the figure is a plot 310 illustrating the inrush current of a power transformer 110 and a corresponding plot 320 illustrating the output of a Rogowski coil 130A, 130B according to one exemplary embodiment of the present invention. Plot 310 illustrates the inrush current of a power transformer 110. Inrush current is the input to the power transformer 110 when power is initially applied to the transformer 110. Inrush current is a startup transient. When a power transformer is first energized, an inrush current much larger than the rated transformer current can flow for up to tens of seconds or more. In a networked application, the transformer 110 may be energized from the primary side or from the secondary side. Since inrush current may generally flow only to one side of the transformer, the inrush current plot 310 may be related to either one of the sense transformers 130A, 130B depending upon which side of the transformer is being energized.

Plot 320 illustrates the output of a Rogowski coil 130A, 130B sensing the inrush current illustrated in plot 310. The voltage that is induced in the Rogowski coil is proportional to the rate of change of current being sensed. This rate of change of current is also called the first time derivative of the current, or di/dt, or change in current per change in time. The substantially flat portions 330 of each cycle of the plot 330 represent periods of low rate of current changes. These low di/dt periods 330 may be used by the differential protection controller 150 to detect an inrush condition. Detecting an inrush condition can allow blocking operation of the protection relay during inrush. Even though the differential threshold of the protection system may be exceeded during inrush, there may be no actual fault condition.

Figure 4:
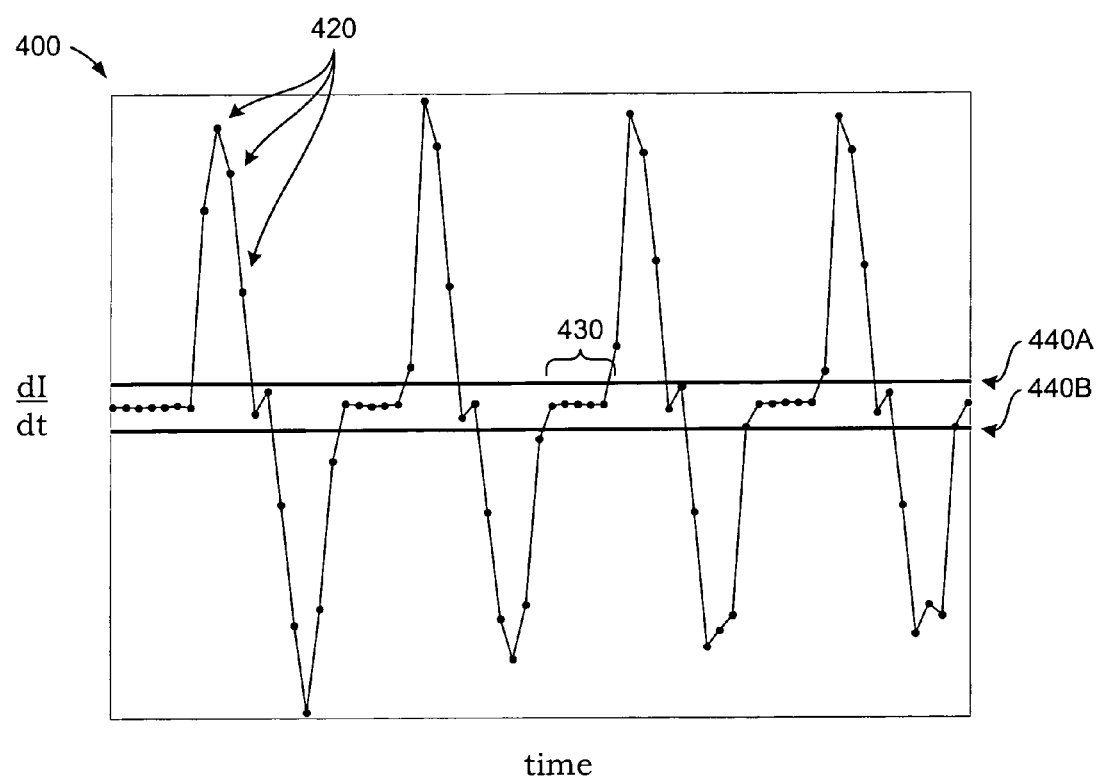
FIG. 4 is a plot of a sampled Rogowski coil output while sensing the inrush current of a power transformer according to one exemplary embodiment of the present invention.

Turning now to FIG. 4, the figure is a plot 400 of a sampled Rogowski coil 130A, 130B output while sensing the inrush current of a power transformer 110 according to one exemplary embodiment of the present invention. Plot 400 illustrates the output of a Rogowski coil 130A, 130B sensing the inrush current of a power transformer 110 similar to that illustrated in Plot 320. The points along the curve of Plot 400, three examples of which are labeled 420, may represent discrete time samples, or snapshots, of the Rogowski coil 130A, 130B output. The five samples in region 430 of the Plot 400 can represent a low di/dt period similar to region 330 of Plot 320. Such low di/dt periods may be used by the differential protection controller 150 to detect an inrush condition. For example, the differential protection controller 150 may operate to detect multiple sequential samples that lie between the lower limit along line 440B and the upper limit along line 440A. In such an example, when multiple samples 420 in a row lie between the limits 440A, 440B, then an inrush condition may be detected and used to block protection relay operation.

Turning now to FIG. 5, the figure shows a logical flow diagram of a process 500 for detecting transformer inrush current in a differential protection system using Rogowski coils according to one exemplary embodiment of the present invention. Certain steps in the processes or process flow described in the logic flow diagram referred to hereinafter naturally precede others for the invention to function as described. However, the invention is not limited to the order of the steps described if such order or sequence does not alter the functionality of the invention. That is, it is recognized that some steps may be performed before, after, or in parallel with other steps without departing from the scope or spirit of the invention.

In Step 510, the current flowing in the primary conductor 120A may be sensed by the primary side Rogowski coil 130A and the current flowing in the secondary conductor 120B may be sensed by the secondary side Rogowski coil 130B. The voltage induced in the respective Rogowski coils is proportional to the rate of change of current being sensed. This rate of change of current is also called the first time derivative of the current, or di/dt, or change in current per change in time. Thus, the primary side Rogowski coil 130A outputs a signal proportional to the primary di/dt and the secondary side Rogowski coil 130B outputs a signal proportional to the secondary di/dt.

In Step 530, the processor 150 samples the primary di/dt signal and the secondary di/dt signal to obtain a discrete time representation of the two di/dt signals, also known as the sampled di/dt signals. Examples of the sampling rate may be sixteen times per cycle of the power signal, sixty-four times per cycle of the power signal, 256 times per cycle of the power signal, any sampling rate allowed by the Nyquist-Shannon sampling theorem, any fraction, factor, or multiple thereof, or any other suitable quantity of samples per cycle.

In Step 535, the processor 150 subtracts the sampled di/dt signals obtained in Step 530 to calculate a discrete time, or sampled, difference between the primary di/dt signal and the secondary di/dt signal for each set of discrete di/dt signals (in other words, for each primary di/dt and secondary di/dt samples at the same time). The difference can be called the differential di/dt, or the sampled differential di/dt.

In Step 540, the processor 150 determines if the sampled differential di/dt falls within a low range for at least a predetermined number 'n' of sequential samples per cycle of the power signal.

In an exemplary embodiment, the number of predetermined number 'n' of sequential samples can be based on a percentage of the number of samples in one cycle according to the sampling rate. For example, the predetermined number 'n' of sequential samples can be at least one-fifth of the number of samples in one cycle, one-fourth the number of samples in one cycle, or another suitable percentage of the number of samples in one cycle. In an exemplary embodiment, the sampling rate can be sixteen samples per cycle, and the predetermined number 'n' of sequential samples can be three or four.

In exemplary embodiments, the values specifying the low range may be a function of the peak current, inrush current, or rated current, or may be predetermined to represent low values of di/dt. For example, the limits may be plus or minus 5%, 10%, 20%, 25%, 30%, or other suitable percentage of any of the peak current, inrush current, or rated current. These are merely examples, and any other suitable limit may be specified either as a constant or as a function of some other suitable system parameter. A typical value of about 10% of a peak current may be use in one exemplary application. The low range can be the range between lines 440A and 440B as previously discussed with respect to FIG. 4. The quantity 'n' may be one quarter of the number of samples per power cycle, as one example representing the requirement that the low values be present for one quarter of the cycle. The quantity 'n' also may be any other suitable fraction of the number of samples per cycle or any other previously determined or adaptive quantity. If the sampled di/dt did not fall within the low range for 'n' sequential samples or more, then the process loops back to Step 530 where the next samples of the di/dt signals are obtained. If the sampled di/dt has, in fact, been within the low range for 'n' sequential samples or more, then the process 500 has detected an inrush condition and will proceed to Step 550 to block the operation of the differential protection element of the protection relay for the next 'm' cycles as discussed in more detail below with respect to Step 580. The value 'm' may be any predetermined number of cycles provided for the inrush current to settle into its steady state. Alternatively, the quantity 'm' may be adaptive to the inrush current magnitude or rate of the inrush current damping.

In Step 560, the processor 150 obtains the primary current $I_p$ from the primary di/dt as well as the secondary current $I_s$ from the secondary di/dt. The currents can be obtained from the di/dt signals using scaling and phase shifting. The Rogowski coil output signals have voltages proportional to the currents being sensed but shifted 90 degrees in phase. Thus, a phase shift and scalar magnitude correction in the frequency domain may be used to obtain the two current signals from the two di/dt signals. Alternatively, the currents can be obtained from the di/dt signals through more traditional integration performed in the digital domain, analog domain, or by any other method of integrating.

In step 565, the primary current $I_p$ and the secondary current $I_s$ can be subtracted to obtain $I_{diff}$ or the differential current. The differential current can be the difference between the current of the primary conductor 120A and the current of the secondary conductor 120B.

In Step 570, the processor 150 determines if $I_{diff}$ is greater than the differential threshold. The differential threshold may be constant, or it may be provided by a slope function such as those examples discussed previously with respect to FIG. 2. If processor 150 determines that $I_{diff}$ is not greater than the differential threshold, then the process 500 loops back through Step 560 to continue obtaining the differential current and evaluating the differential current against the threshold current. If it is decided that $I_{diff}$ is, in fact, greater than the differential threshold, then there may be a fault condition and the process 500 continues to Step 580. Such a fault condition may be a potentially false fault condition if the power transformer 110 is currently receiving inrush current.

In Step 580, the processor 150 determines if Step 550 is blocking the protection relay. Such blocking can be due to the detection of an inrush condition. If the protection relay is, in fact, blocked then the relay is, not operated and the process 500 returns to Step 560 to continue obtaining the differential current and evaluating the differential current against the differential threshold. If the protection relay is not blocked, then the process continues to Step 590 where the protection relay is operated.

In Step 590, the protection relay may be operated to isolate the power transformer 110. Such isolation may protect the power system from damage or losses due to system faults. After the protection relay is operated, the system may be manually or automatically reset and process 500 may be reentered to provide continued system protection.

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the present invention is to be provided the scope set forth by the claims that follow.

What is claimed is:

1. A power transformer protection system, comprising:
a first Rogowski coil positioned to sense a primary current associated with a primary of the power transformer and to output a primary signal indicative of the primary current;
a second Rogowski coil positioned to sense a secondary current associated with a secondary of the power transformer and to output a signal indicative of the secondary current;
a protection relay configured to isolate the power transformer when the protection relay is activated; and
a controller operable to activate the protection relay, wherein the controller is further operable to compare the output of the first Rogowski coil and the output of the second Rogowski coil to obtain a differential first time derivative of current, to sample the differential first time derivative of current based on a sampling rate, to detect an inrush condition when a predetermined number of sequential samples of the differential first time derivative of current are within a predetermined range, and to prevent activation of the protection relay in response to detecting the inrush condition.

2. The system of claim 1, wherein the controller prevents activation of the protection relay by delaying activation of the protection relay for a predetermined number of cycles after detection of the inrush condition.

3. The system of claim 1, wherein the sampling rate is one of sixteen times per cycle, sixty-four times per cycle, and 256 times per cycle.

4. The system of claim 1, wherein the predetermined range is based on a percentage of at least one of a peak current, an inrush current, and a rated current.

5. The system of Claim 4, wherein the percentage is at least one of plus and minus 5%, 10%, 20%, 25%, and 30%.

6. The system of claim 1, wherein the predetermined number of sequential samples is based on a percentage of the number of samples in one cycle according to the sampling rate.

7. The system of claim 1, wherein the predetermined number of sequential samples is one-fourth the number of samples in one cycle according to the sampling rate.

8. The system of claim 1, wherein the predetermined number of sequential samples is at least one-fifth the number of samples in one cycle according to the sampling rate.

9. The system of claim 1, wherein the sampling rate is sixteen samples per cycle, and wherein the predetermined number of sequential samples is one of three samples and four samples.

10. The system of claim 1, wherein the controller is further operable to determine that activation of the protection relay is warranted in response to a determination that a difference between the primary current and an adjusted value of the secondary current exceeds a specified limit, and wherein the controller prevents the warranted activation of the protection relay in response to the detection of the inrush condition.

11. A method for detecting inrush current of a power transformer, comprising the steps of:
sensing a primary first time derivative of current using a first Rogowski coil;
sensing a secondary first time derivative of current using a second Rogowski coil;
comparing the primary first time derivative of current and the secondary first time derivative of current to determine a differential first time derivative of current;
sampling the differential first time derivative of current; and
determining the existence of an inrush condition in response to the sampled differential first time derivative of current.

12. The method of claim 11, further comprising the step of blocking operation of a protection relay in response to a determination of the existence of an inrush condition.

13. The method of claim 11, wherein the step of determining the existence of an inrush condition comprises specifying a range for the differential first time derivative of current and identifying a predetermined number of sequential samples of differential first time derivative of current within the specified range.

14. The method of claim 13, wherein specifying a range for first time derivative of current comprises specifying at least one limit of the range as a percentage of one of a peak current, an inrush current, and a rated current.

15. The method of Claim 14, wherein the percentage is one of 5%, 10%, 20%, 25%, and 30%.

16. The method of claim 11, wherein the step of sampling the differential first time derivative of current comprises sampling sixteen times per cycle, and wherein the predetermined number of sequential samples is one of three samples and four samples.

17. The method of claim 11, wherein the step of determining the existence of an inrush condition comprises identifying one-fourth of samples per power cycle to be sequentially within a specified range for differential first time derivative of current.

18. The method of claim 11, wherein the step of determining the existence of an inrush condition comprises identifying at least one-fifth of samples per power cycle to be sequentially within a specified range for differential first time derivative of current.

19. The method of claim 11, wherein the step of sampling the differential first time derivative of current comprises sampling one of sixteen times per cycle, sixty-four times per cycle, and 256 times per cycle.

20. A method for differential protection of a power transformer, comprising the steps of:
    sensing a primary first time derivative of current using a first Rogowski coil;
    sensing a secondary first time derivative of current using a second Rogowski coil;
    sampling the primary first time derivative of current to obtain a first sample;
    sampling the secondary first time derivative of current to obtain a second sample;
    comparing the first sample and the second sample to determine a differential first time derivative of current;
    repeating the sensing, sampling, and comparing steps to obtain a plurality of differential first time derivatives of current;
    determining an existence of an inrush condition in response to a predetermined number of sequential differential first time derivatives of current being within a specified range; and
    blocking operation of a protection relay in response to a determination of the existence of an inrush condition.

21. The method of claim 20, further comprising the steps of:
    obtaining a differential current from the primary first time derivative of current and the secondary first time derivative of current;
    comparing the differential current to a differential threshold; and
    operating the protection relay if the differential current exceeds the differential threshold unless operation of the protection relay has been blocked.

22. The method of claim 20, wherein the sampling steps are repeated to achieve a sampling rate that is one of sixteen times per cycle, sixty-four times per cycle, and 256 times per cycle, and wherein the predetermined number of sequential differential first time derivatives of current is based on a percentage of the number of samples in one cycle according to the sampling rate.

23. The method of claim 22, wherein the predetermined number of sequential differential first time derivatives of current is at least one-fifth the number of samples in one cycle according to the sampling rate.

24. The method of claim 22, wherein the sampling rate is sixteen samples per cycle, and wherein the predetermined number of sequential differential first time derivatives of current is one of three samples and four samples.

25. A power transformer protection system, comprising:
    a first Rogowski coil positioned to sense a primary current associated with a primary of the power transformer and to output a primary signal indicative of the primary current;
    a second Rogowski coil positioned to sense a secondary current associated with a secondary of the power transformer and to output a signal indicative of the secondary current;
    a protection relay configured to isolate the power transformer when the protection relay is activated; and
    a controller operable to activate the protection relay,
    wherein the controller is further operable to compare the output of the first Rogowski coil and the output of the second Rogowski coil to obtain a differential first time derivative of current, to sample the differential first time derivative of current based on a sampling rate, to detect an inrush condition when a predetermined number of sequential samples of the differential first time derivative of current are in a substantially flat portion of a cycle, and to prevent activation of the protection relay in response to detecting the inrush condition.

26. The system of claim 25, wherein the controller prevents activation of the protection relay by delaying activation of the protection relay for a predetermined number of cycles after detection of the inrush condition.

27. The system of claim 25, wherein the sampling rate is one of sixteen times per cycle, sixty-four times per cycle, and 256 times per cycle.

28. The system of claim 25, wherein the predetermined range is based on a percentage of at least one of a peak current, an inrush current, and a rated current.

29. The system of claim 25, wherein the predetermined number of sequential samples is based on a percentage of the number of samples in one cycle according to the sampling rate.

30. The system of claim 25, wherein the controller is further operable to determine that activation of the protection relay is warranted in response to a determination that a difference between the primary current and an adjusted value of the secondary current exceeds a specified limit, and wherein the controller prevents the warranted activation of the protection relay in response to the detection of the inrush condition.

* * * * *